United States Patent
Molinazzi et al.

(10) Patent No.: US 12,487,139 B2
(45) Date of Patent: Dec. 2, 2025

(54) MODULAR SENSOR DESIGNS AND APPLICATIONS THEREOF

(71) Applicant: EZMEMS LTD., Caesarea (IL)

(72) Inventors: Nicola Molinazzi, Kfar Sava (IL); Tsvi Shmilovich, Pardes Hanna-Karkur (IL)

(73) Assignee: EZMEMS LTD., Caesarea (IL)

(*) Notice: Subject to any disclaimer, the term of this patent is extended or adjusted under 35 U.S.C. 154(b) by 334 days.

(21) Appl. No.: 18/270,695

(22) PCT Filed: Jan. 5, 2022

(86) PCT No.: PCT/IL2022/050017
§ 371 (c)(1),
(2) Date: Jun. 30, 2023

(87) PCT Pub. No.: WO2022/149128
PCT Pub. Date: Jul. 14, 2022

(65) Prior Publication Data
US 2024/0077376 A1    Mar. 7, 2024

Related U.S. Application Data

(60) Provisional application No. 63/134,013, filed on Jan. 5, 2021.

(51) Int. Cl.
*G01L 19/00* (2006.01)
*G01L 19/08* (2006.01)
*G01L 19/14* (2006.01)

(52) U.S. Cl.
CPC ........ *G01L 19/0092* (2013.01); *G01L 19/083* (2013.01); *G01L 19/14* (2013.01)

(58) Field of Classification Search
CPC ... G01L 19/0092; G01L 19/083; G01L 19/14; G01D 21/02
See application file for complete search history.

(56) References Cited

U.S. PATENT DOCUMENTS

| | | | |
|---|---|---|---|
| 6,720,887 B1 * | 4/2004 | Zunti | G08C 17/02 128/903 |
| 8,508,368 B2 | 8/2013 | Potyrailo et al. | |

(Continued)

FOREIGN PATENT DOCUMENTS

| | | |
|---|---|---|
| WO | 2019/171376 A1 | 9/2019 |
| WO | 2020/159792 A1 | 8/2020 |

OTHER PUBLICATIONS

Extended European Search Report dated Oct. 22, 2024 as received in Application No. 22736709.1.

*Primary Examiner* — Andre J Allen
(74) *Attorney, Agent, or Firm* — Maschoff Brennan

(57) ABSTRACT

Modular sensor configurations utilize an embeddable sensor module configured for integration into a product or device, or a technical element thereof, for in situ sensing at least one property or condition associated with the product or device, or its technical element, or with a substance contained, processed or streamed therethrough. The embeddable sensor module includes one or more sensor elements that sense the at least one property or condition, and circuitry for generating measurement data/signals indicative of the at least one property or condition, and for transmitting the generated measurement data/signals to an external device. The embeddable sensor module can be powered and activated by signals received from an external device. Such sensing structures/arrays can utilize embeddable sensor modules integrated into a product or device and an external device configure to externally power and activate the embeddable sensor modules to cause them to generate and transmit the measurement data/signals.

20 Claims, 10 Drawing Sheets

(56) References Cited

U.S. PATENT DOCUMENTS

| | | | |
|---|---|---|---|
| 8,615,374 B1 | 12/2013 | Discenzo | |
| 11,761,939 B1* | 9/2023 | Cridge | G01N 33/0062 |
| | | | 73/31.02 |
| 12,265,063 B2* | 4/2025 | Ghods | G01N 3/62 |
| 2013/0334124 A1 | 12/2013 | Konishi et al. | |
| 2014/0319029 A1 | 10/2014 | Karabelas et al. | |
| 2020/0116578 A1 | 4/2020 | Molinazzi et al. | |
| 2020/0350656 A1 | 11/2020 | Vogt | |
| 2020/0404400 A1 | 12/2020 | Vogt et al. | |
| 2022/0001105 A1* | 1/2022 | Shmilovich | A61M 5/16827 |
| 2024/0073831 A1* | 2/2024 | Fahim | H04W 4/38 |

\* cited by examiner

MODULAR SENSOR DESIGNS AND APPLICATIONS THEREOF

TECHNOLOGICAL FIELD

The present invention is generally in the field of sensing devices, particularly modular sensing devices suitable for wide area/volume and array distribution.

BACKGROUND

This section intends to provide background information concerning the present application, which is not necessarily prior art.

Situational awareness applications require high-performance data and sensor fusion from the edge points e.g., of Internet of Things (IoT) units/systems. Existing sensing solutions are usually too bulky and expensive to be integrated at the edge/intermediate points/parts, wherein sensing is mostly needed for monitoring/controlling physical, mechanical and/or chemical interactions. Many applications require solutions for guaranteeing deterministic, reliable, high performance and versatile sensing of multiple physical, electrical and/or chemical parameters/properties at the edge/intermediate points/parts of systems/devices, to enable high quality data acquisition and insights. However, the sensing conventionally used nowadays is usually limited due to the need to implement sensing elements and electrical connectivity in plastic parts, which could be for either single or multiuse.

Other difficulties in provisioning of such sensing capabilities are due to the growing need to concurrently measure several different parameters/properties at the edge/intermediate points/parts of systems/devices. The installation of multiple sensing devices at/in such edge/intermediate points/parts is bulky and difficult to implement without interfering in the operation of the monitored/controlled system/device and/or causing cross-sensor interferences. Further difficulties are involved in the concurrent acquisition and on-site processing of the measurement data generated by various different sensing elements installed in multiple edge/intermediate points/parts of systems/devices.

There is thus a need in the art for sensor designs and configurations suitable for quickly and easily embedding into edge/intermediate points/parts or products, reliably and concurrently sensing multiple paraments/properties (e.g., physical, electrical and/or chemical) therein, and having suitable connectivity for deterministic, high performance sensing.

Some sensor device designs known from the patent literature are briefly described hereinbelow.

US Patent Publication No. 2013/334124 discloses a separation membrane module including: a tubular pressure container in which a raw liquid is filtered through a separation membrane to produce a permeate liquid; and an internal member provided in the pressure container. The internal member is equipped with a sensor for detecting characteristics of at least one of the raw liquid and the permeate liquid. A detected signal generated by the sensor is transmitted from an antenna. The internal member has an antenna holding portion in which the antenna is embedded. A gap between the antenna holding portion and an inner peripheral surface of the pressure container is sealed with a sealing member.

US Patent Publication No. 2014/319029 discloses a method and apparatus for continuous monitoring of permeate from membrane elements in a water treatment plant, including a desalination plant. The apparatus includes a probe that includes multiple sensors such that at least one sensor is associated with each membrane element. Each sensor is coupled to a node, which is configured to communicate a signal associated with the permeate quality to a central node sink. The node may communicate wirelessly with the node sink.

International Patent Publication No. WO 2020/159792 discloses a spiral wound membrane module including a specialized endcap assembly including a connecting conduit defining a passageway extending radially inward from its outer periphery, and a differential pressure sensor connected to the passageway of the connecting conduit.

GENERAL DESCRIPTION

One of the main challenges in sensing applications, is to integrate the sensing elements directly into the optimal sensing location, while maintaining low cost and good connectivity with the external control and data monitoring systems. For example, in equipment made of plastic/polymeric materials, and/or single use/disposable plastic/polymeric parts/products, wherein it is desired to have several sensing elements integrated in parts of disposable components of the system e.g., bio reactors, plastic/polymeric tubing and/or connector elements, plastic/polymeric bags, etc. In these cases, the embodiments disclosed herein can be used to integrate the sensing elements within the plastic/polymeric part/product, and power them and acquire the measurement data therefrom externally.

Most sensor devices used nowadays are based on Silicone (Si) semiconductor technology/processing. The present application provides new sensor configurations that are not based on semiconductor technology, and which can be manufactured utilizing simpler common techniques e.g., composite plastic based sensors, which provide for, inter alia, lower costs, direct integration into plastic, multi-sensing applications.

A further advantage of the embodiments disclosed herein relates to environmental and recycling issues, in which there is a need to separate between a recyclable sensing portion (which could also be fully made of polymeric materials) and the electronics and batteries parts, which need to be treated differently/separately.

In a broad aspect the present application provides passive sensing modules/elements (also referred to herein as embeddable sensing modules/elements) configured for direct integration into products/parts/technical elements (e.g., during their production processes and/or on-site installation), and for being externally powered and activated to generate measurement data/signals and transmit the same to one or more external devices. Optionally, but in some embodiments preferably, the passive sensing elements are configured to be wirelessly powered and activated. Similarly, the measurement data/signals generated by the passive sensing elements can be transmitted over one or more wireless communication channels to the one or more external devices, for example, by radio frequency communication (e.g., near-field communication—NFC, near-field magnetic induction—NFMI, Bluetooth/BLE—Bluetooth low energy, WiFi, Zigbee, LoRa, or suchlike).

The term technical element used herein to refer to a part/component (e.g., pipes/tubes, connectors/adapters, containers/vessels/reactors and/or their lids/closures, filters/membranes, radiators/heat exchangers, supports, fittings, and suchlike) of machinery, product, or system, usually separately manufactured readily for assembly with other parts/components. Optionally, but not essentially, the technical elements are made of polymeric materials, and the passive sensing elements disclosed herein are configured for direct integration thereinto during their manufacture e.g., by injection molding, overmolding, extrusion, welding techniques, gluing, etc. The passive sensing modules/elements hereof can be easily embedded in other parts/elements made from other types of materials (e.g., metals, silicon/rubber, ceramics, glass, composite materials), prepared utilizing the above-mentioned techniques, or any other suitable technique e.g., layer-by-layer (LbL) fabrication techniques.

The present application is also directed to a reading module configured to power and activate one or more of the embeddable sensor modules for causing them to generate the measurement data/signals, and to transmit the same to the one or more external devices. Optionally, but in some embodiments preferably, the reading module is further configured to receive the measurement data/signals transmitted by the embeddable sensor modules thereby powered/activated. More optionally, the reading module is configured to also process and/or display the measurement data/signals received from the embedded sensing modules, and/or communicate the same elsewhere. The reading module can be configured to concurrently power/activate a group of embeddable sensor modules, or to selectively power/activate a single one of the group of the embeddable sensor modules at a time, for generation and transmission of the measurement data/signals therefrom.

Embodiments of the present application provide modular sensor designs having the passive sensor module embeddable into the products/parts/technical element e.g., pipes, bags, connectors, machinery/equipment, and the reading module configured to be detachably installed in a vicinity (few micrometers to few meters) of the passive sensor module, to wirelessly (e.g., inductively and/or by radiofrequency (RF) radiation/energy/power, or by electrical contacts) power the passive sensor module, and communicate data (wirelessly or by electrical contacts) with the embeddable sensor module.

The embeddable sensor modules can be integrated into a plurality of different products/parts/elements of machinery/equipment e.g., during their manufacture and/or installation, and/or into suitable connectable adapters thereof, to construct sensing arrays/structures configured for measuring properties/conditions of substances/products contained, streamed and/or processed therein, and/or of the products/parts/elements per se. A respective one of the detachable reading modules can be placed/installed in the vicinity of each one of the embeddable sensor units, or of in the vicinity of a group of the embeddable sensor unit, at any suitable time thereafter, for powering, activating the same, and optionally also receiving the measurement data/signals therefrom. One or more of the detachable reading modules can be configured for exporting the measurement data/signals received from the embeddable sensor modules to external monitoring devices/system, and/or for processing and/or displaying the same in a display device thereof.

In this way the modular sensor designs disclosed herein can be manufactured and distributed as two separate parts, one of which being embedded into a product/part/technical elements during, or after, manufacture thereof for in situ sensing, and the other being detachably mounted thereafter on, or in a vicinity, of the product/part/technical element carrying the embeddable sensor module for wirelessly powering/activating it and communicating measurement data/signals therewith.

Optionally, the modules of the two parts modular sensor device can be distributed separately to various/multiple different entities participating in the production of the products/parts/systems. For example, the embeddable sensor module can be distributed to manufacturers of products/parts, machinery/equipment elements for embedding them in the different product/parts/technical elements, and the detachable reading modules can be separately distributed to assembly companies/contractors or users of the products/parts for mounting/exploitation at any appropriate time during assembly or use thereof.

In possible embodiments a plurality of embeddable sensor modules are integrated into a respective plurality of vessels/containers/technical elements for monitoring properties/conditions (e.g., physical, and/or electrical, and/or chemical) of a substance/product contained thereinside, and at least one detachable reading module is mounted externally in (or on) a packaging/enclosure in which said plurality of vessels/containers are stored, for powering/activating the plurality of embeddable sensor modules and receiving from them measurement data indicative of the properties/conditions of the substance/product contained in their vessels/containers.

The embeddable sensor module is embedded or attached in some embodiments to the end product/part/technical element, and the detachable reading module can be attached (e.g., by a mechanical attachment mechanism), or plugged, or screwed in the vicinity of the embeddable sensor module. Optionally, the embeddable sensor module is configured for assembly with (coupling to e.g., by threads) the detachable reading module.

One aspect of the present application is directed to a modular sensor device comprising an embeddable sensor module configured for integration into a product or device, or a technical element thereof, for in situ sensing therein at least one property or condition associated with said product or device, or its technical element, or with a substance contained, processed or streamed therethrough. The embeddable sensor module comprises one or more sensor elements configured for sensing the at least one property (parameter) or condition, and circuitry for generating measurement data/signals indicative of said at least one property or condition, and for transmitting the generated measurement data/signals to an external device. The embeddable sensor module can be configured to be powered and activated by signals received from an external device. The external device can be a detachable reading module configured for mounting external to the product or device, or its technical element and in a vicinity of the embeddable sensor module. The detachable reading module can be configured to activate the embeddable sensor module and receive the measurement data thereby transmitted. The detachable reading module can be configured to power the embeddable sensor module wirelessly (e.g., by electromagnetic radiation, such as radiofrequency—RF) and/or via contact pads.

In some embodiments the embeddable sensor module is implemented as a chip or an integrateable sensing foil. Optionally, but in some embodiments preferably, the embeddable sensor module (e.g., implemented as a chip or integrateable sensing foil) is made mainly, or entirely, from recyclable (e.g., polymeric) materials. Optionally, the end product or device, or its technical element, is made of plastic/polymeric material. At least one of the embeddable sensing module and the detachable reading module is optionally at least partially made from polymeric/plastic materials. The embeddable sensor module is integrated in some embodiments into or onto at least one of a wall portion of the product or device, or a connector or adapter thereof.

Optionally, the detachable reading module is configured to transmit the measurement data to a computing device and/or a communication hub.

In another aspect the present application is directed to a reading module (also referred to herein as a detachable reading module) configured for mounting in a vicinity of the embeddable sensor module according to any one of the embodiments disclosed hereinabove or herein below, and for externally activating the embeddable sensor module thereby causing measurement of the at least one property (parameter) or condition. The reading module can be configured to receive (wirelessly, or over serial/parallel data bus) the measurement data/signals transmitted by the embeddable sensor module. Optionally, the reading module is configured to transmit (e.g., over a computer/data network) the measurement data/signals received from the embeddable sensor module to a remote device/system (e.g., cloud center, database/server).

Another aspect of the present application is directed to a distributed sensing array comprising a plurality of the embeddable sensor modules according to any of the embodiments described hereinabove or hereinbelow integrated into a plurality of products or devices, or technical elements thereof, and at least one detachable reading module according to any of the embodiments described hereinabove or hereinbelow configured to wirelessly power and activate the plurality of embeddable sensor modules and receive the measurement data/signals transmitted from them. The plurality of embeddable sensor modules can be directly integrated into respective containers or vessels, or sealing lids/caps thereof.

In some embodiments the plurality of embeddable sensor modules are directly integrated into components of a filtration system (e.g., water filtration), or of a fluid (e.g., gas substance, or liquid/water) treatment systems. The distributed sensing array can have at least one embeddable sensor module directly integrated into a wall of a pressure vessel. Optionally, at least one embeddable sensor module is directly integrated into a connector fluidly connecting filtrate permeate tubes of filtration units of the filtration system. More optionally, at least one embeddable sensor module is directly integrated into an end member of a filtration unit of the filtration system. Yet more optionally, at least one embeddable sensor module is directly integrated into filtration medium of a filtration unit of the filtration system.

The distributed sensing array can comprise a single embeddable sensor module.

Optionally, but in some embodiments preferably, the distributed sensing array is configured for locating antenna elements of the embeddable sensor and detachable reading modules as close as possible one to the other for improved coupling/communication therebetween.

Other aspects of the present application are directed to the use of the distributed sensing array according to any one of the embodiments disclosed hereinabove or hereinbelow for at least one of the following: monitoring properties or conditions of food products; monitoring or controlling a process inside a vessel or reactor; monitoring or controlling a desalination process.

In yet another aspect the present application is directed to a method of monitoring or controlling at least one property or condition associated with a product or device, or a substance contained, streamed or processed thereinside. The method comprises directly integrating one or more embeddable sensor modules into at least one part or technical element of the product or device during manufacture or installation thereof, the embeddable sensor module comprising one or more sensing elements and configured to be externally powered and activated to measure the at least one property or condition, and generate and transmit measurement data or signals indicative thereof, mounting at least one reading module in a vicinity of the product or device, powering and activating the embeddable sensor module by the reading module for operably measuring the at least one property or condition of the substance or product, and transmitting the data or signals from the embeddable sensing module.

The directly embedding of the one or more embeddable sensor modules can be carried out utilizing an injection molding, overmolding, extrusion, welding, or layer-by-layer fabrication technique of the part or technical element.

The method comprises in some embodiments wirelessly powering and activating the one or more embeddable sensor modules by the reading module. The method can comprise wirelessly transmitting the data or signals from the one or more embeddable sensor modules. In some application the method comprises receiving by the at least one reading the data or signals transmitted by the one or more embeddable sensor modules. In a variant the method comprises transmitting the data or signals to a remote device wirelessly, or over a data network. Optionally, the method comprises providing in the remote device a display indicative of the data/signals generated by the one or more embeddable sensing modules.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 7A to 7I schematically illustrate possible applications of the modular sensor device according to possible embodiments;

FIGS. 11A to 11C are flowcharts schematically illustrating sensing applications according to some possible embodiments, wherein FIG. 11A illustrates production and assembly of the modular sensor device, and FIGS. 11B and 11C illustrate possible utilizations of the modular sensor device.

DETAILED DESCRIPTION OF EMBODIMENTS

Figure 1:
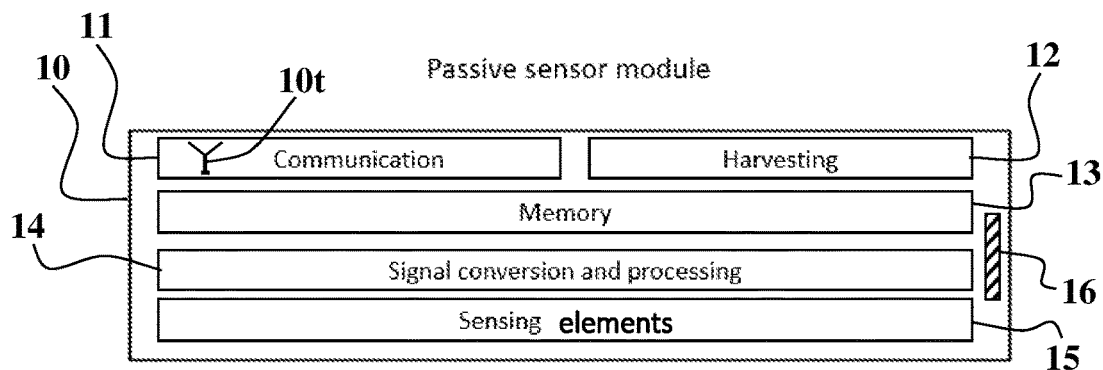
FIG. 1 schematically illustrates an embeddable sensor module according to some possible embodiments.

Mass sensor integration in products/parts/technical elements for smart control and management applications (e.g., IoT) is currently difficult to achieve, inter alia for the following reasons:
- the costs of the sensor device, mostly due to the costs involved in the packaging of the sensing elements, e.g., the encapsulation of a Silicon die for a pressure sensor;
- the costs of the sensing system or device when more than one parameter/property (physical, electrical and/or chemical) is being measured;
- the increased physical dimensions due to the packaging and integration of existing sensors, especially when the system requires sensing of more than one property/condition e.g., physical parameter;
- the costs and complexity associated with the integration and assembly of conventional sensors, especially when sensing of multiple properties/conditions e.g., physical parameters is required;
- the costs and efforts involved in the integration of the sensor devices into plastic products/parts e.g., disposable or single use plastics;
- the communication with the sensor device(s), and/or from the sensor device(s) to a remote data/control storage/center, which might be wireless, e.g., when the sensor device(s) is integrated inside a plastic product/part;
- the requirement to selectively (e.g., periodically or intermittently) power the sensor device(s), even in a wireless and/or battery-less fashion, such as when the sensor device is integrated inside a plastic product/part;
- direct integration into, or with, existing plastic products/parts (technical elements e.g., pipes, fittings, bags), after, or even during, the fabrication of the plastic product/part;
- the requirement for a very small footprint, excellent robustness (e.g., for chemical substances, high pressure and/or temperature conditions);
- requirement for recyclability of the sensor device e.g., by physically separating the electronic circuitries and battery components from the sensor elements of the device, especially when the sensor device is integrated inside a recyclable plastic product/part;
- the requirement for a fully wireless sensor device i.e., having no battery, no connecting wires, and/or having energy harvesting capabilities; and
- the desire to achieve a fully operable autonomous sensor device including various different sensing elements and data processing/analysis capabilities within a single plastic product/part.

The present application discloses configurations and applications of modular sensor devices having separate embeddable sensor module and reading module. The sensor module is generally designed as an embeddable sensor module that can be readily attached or integrated into products/parts, machinery or equipment e.g., plastic/polymeric parts/technical elements, and measure one or more properties/conditions of interest (e.g., associated therewith and/or with a substance contained or processed therein, and/or streamed therethrough). The reading module is configured for separately mounting in a vicinity of one or more of the embeddable sensor modules, communicate measurement data with said one or more embeddable sensor modules, and output, export and/or display, data associated with the measured one or more properties/conditions.

The modular sensor device embodiments disclosed herein are usable for a myriad of different applications, such as, for example:
- for integration of sensing capabilities and connectivity into pipes, fittings, and/or related devices (e.g., pressure regulators, filters), for water or gas applications;
- for medical applications e.g., involving single use plastic parts/elements for implementing fluidic paths, such as drug infusion/dispensation, respiratory monitoring applications, urine monitoring, single use bags and vessels for collecting drainage from patients;
- sensing arrays/structures embedded into fluid filtration systems; and
- for the integration of sensing capabilities and connectivity inside single use bags, vessels and/or reactors for biotechnological and biopharma applications.

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Elements illustrated in the drawings are not necessarily to scale, or in correct proportional relationships, which are not critical. Emphasis instead being placed upon clearly illustrating the principles of the invention such that persons skilled in the art will be able to make and use the modular sensor device, once they understand the principles of the subject matter disclosed herein. This invention may be provided in other specific forms and embodiments without departing from the essential characteristics described herein.

For an overview of several examples features, process stages, and principles of the invention, the examples of the modular sensor device illustrated schematically and diagrammatically in the figures are mainly intended for monitoring fluidic/liquid substances in containers and/or bags and/or vessels and/or tubes/pipes. These applications are shown as one example implementation that demonstrates a number of features, processes, and principles utilizing the modular sensor device configurations, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in sensor applications may be suitably employed, and are intended to fall within the scope of this disclosure.

In a broad aspect, the preset application provides modular sensor designs configured for wide area/volume distribution of a plurality of embeddable sensor modules inside machinery/products to construct sensing array/structures capable of simultaneously measuring different properties and/or conditions associated with the machinery/products, and/or with a substance material thereby contained, streamed and/or processed. Each of the embeddable sensor modules is configured to measure one or more of the properties/conditions and transmit (e.g., wirelessly and/or over a serial/parallel data bus) measurement data/signals indicative thereof to at least one other proximally located embeddable sensor module and/or to at least one proximally located reading module.

FIG. 1 schematically illustrates an embeddable sensor module 10 configured according to some possible embodiments for attachment and/or integration into parts/technical elements e.g., of machinery/equipment, and measuring one or more properties/conditions thereof and/or of a substance material related thereto. The embeddable sensor module 10 comprises one or more sensor units 15 for measuring the one or more properties/conditions, circuitry 14 for processing measurement signals/data generated by the one or more sensor units 15, one or more memory units 13 for storing data therein (e.g., calibration data, sensors readings), and a communication module 11 for exchanging data with one or more external devices (e.g., using radiofrequency (RF) radiation/energy/power, and/or inductively, via antenna 10$t$). In possible embodiments the communication module 11 can be configured to communicate data/signals with the external devices over communication wires/lines (e.g., implementing a serial/parallel bus utilizing any suitable serial/parallel data communication protocol).

Optionally, but in some embodiments preferably, the embeddable sensing module 10 is a passive sensor module comprising a harvesting unit 12 configured to harvest electromagnetic (EM) energy and convert it into electrical energy for powering the various different components of the embeddable sensor module 10. In possible embodiments the harvesting unit is configured to harvest other sources of energy e.g., vibrations and/or acoustic waves. Alternatively, or additionally, an (optional) internal power source (e.g., battery) 16 is used to power at least some of the various different components of the embeddable sensor module 10. For example, but without being limiting, the embeddable sensor module 10 can be integrated directly into plastic parts/technical elements, or provided as an attachable sensor foil.

The embeddable sensor module 10 is relatively simple and inexpensive to manufacture, particularly utilizing polymeric materials readily for direct integration into plastic part/technical elements, which may be thus recyclable as well. This design of the embeddable sensor module 10 is advantageously used in some embodiments to construct sensing arrays/structures configured for monitoring and/or controlling state/condition and/or operation of products/systems having a plurality of the embeddable sensor modules 10 directly integrated into their parts/technical elements.

Figure 2:
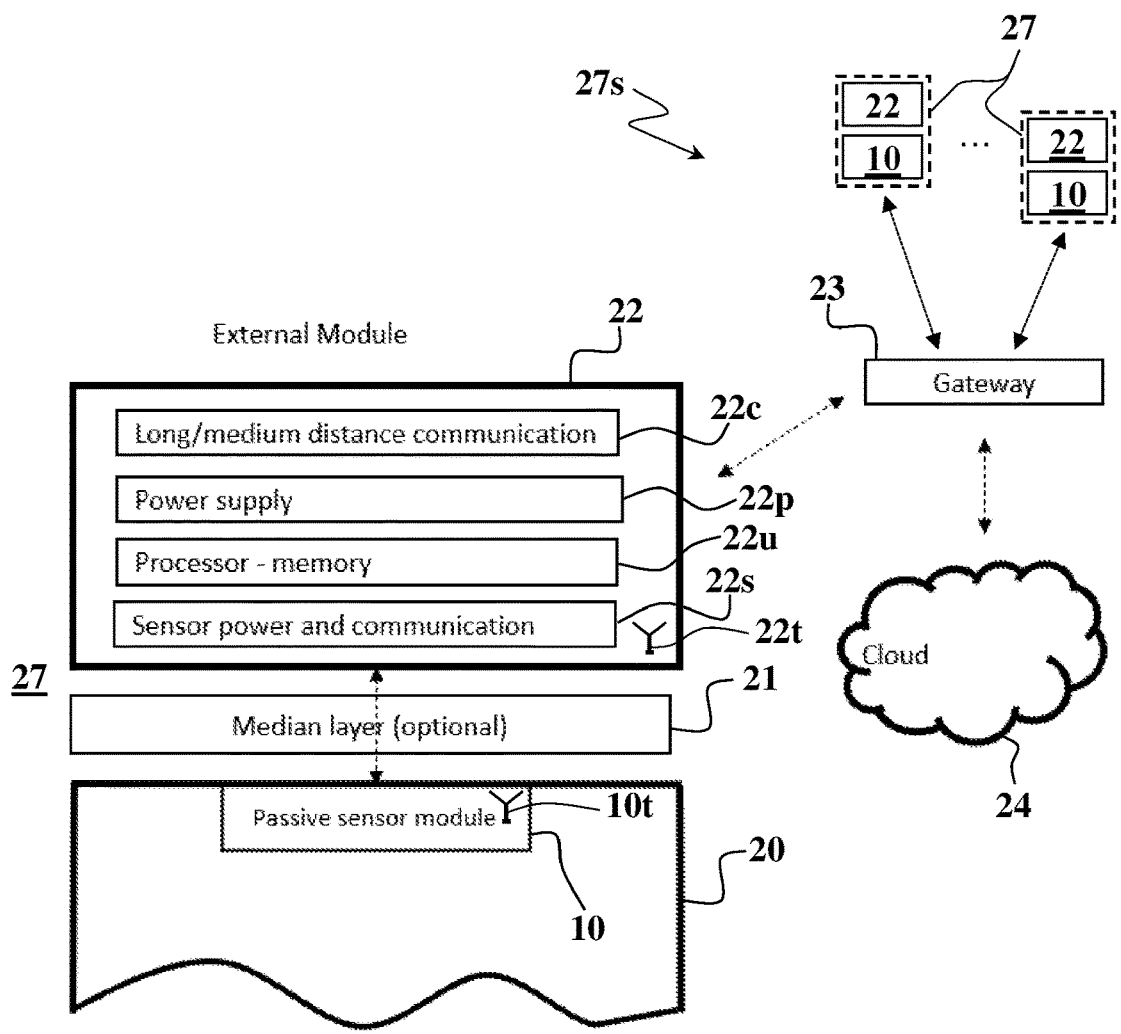
FIG. 2 schematically illustrates a modular sensing device according to some possible embodiments having a detachable reading module utilizing the embeddable sensor module.

FIG. 2 schematically illustrates a modular sensing device 27 having (external) detachable reading module 22 operably mounted for data communication with the embeddable sensor module 10 attached or directly integrated into end product/part or machinery/equipment 20 (e.g., technical elements such as containers, packages, reactors, pipes/tubes, connectors, caps, bags, bottles). Optionally, the coupling between the embeddable sensor module 10 and the detachable reading module 22 is carried out through at least one median layer 21 partitioning therebetween.

For example, but without being limiting, the passive embeddable sensor module 10 can be integrated into plastic products/parts/technical elements (e.g., during injection molding, overmolding, extrusion, or by welding techniques) of the machinery/equipment 20. The at least one median layer 21 can be a part of the packaging, enclosure, housing, of the product/part/machinery/equipment 20, and/or ambient air and/or water, or any other media used by the machine/equipment during operation.

The embeddable sensor module 10 can be manufactured/implemented by any of the embodiments described, claimed and illustrated in International Patent Publication Nos. WO 2015/114635, WO 2018/025264, WO 2018/092130, WO 2019/171376, WO 2018/235087, WO 2020/129069, and/or U.S. Provisional Patent Application No. 63/195,019 filed on 30 May 2021, and/or US Provisional Patent Application entitled "surface/tactile sensor configurations and applications thereof" to be filed, of the same applicant hereof, the disclosure of which is incorporated herein by reference. In some possible embodiments the embeddable sensor module 10 is a disposable unit configured to remain embedded in the part/technical element e.g., of machinery/equipment 20 after disposal thereof, or out of service placement.

The embeddable sensor module 10 can be integrated in the target product/part 20 utilizing any suitable plastic integration technique, such as, but not limited to, ultrasonic welding, extrusion, laser welding, gluing, heat welding, molding, overmolding, or any combination thereof. This way, the embeddable sensor module 10 can become an integral part of the target product/part 20.

The detachable reading module 22 comprises a power source (e.g., battery, power supply, solar/EM harvesting, or suchlike) 22$p$, a processing (and memory, if needed) unit 22$u$, a wireless (e.g., inductive, Electromagnetic) powering and data communication unit 22$s$, and a (long or medium distance) communication unit 22$c$ for wirelessly (or over a serial/parallel data bus) communicating data with external devices e.g., gateway/hub 23 and/or cloud data centers 24 (e.g., remote data server). The external detachable reading module 22 is designed in some embodiments for placement in a vicinity of the embeddable sensor module 10. Using its wireless powering unit 22$s$ the detachable reading module 22 can be used to wirelessly power the embeddable sensor module 10 (e.g., by EM radiation/energy/power) via its harvesting unit (12), and acquire measurement data/signals therefrom (e.g., by NFC, NFMI, or RFID via RF antenna 22$t$) by means of its communication unit (11).

The embeddable sensor module 10 can be configured to measure multiple physical, electrical and/or chemical, parameters (e.g., pressure, flow rate, temperature, conductivity, turbidity, pH, humidity, vibration, viscosity, dissolved oxygen, dissolved $CO_2$ etc.). Matching interacting antennas 10$t$, 22$t$ (also shown in FIGS. 3, 4A-B and 7I) can be used in the detachable reading module 22 and the embeddable sensor module(s) 10. As exemplified in FIG. 2, the gateway/hub 23 can be used to communicate between the cloud data center 24 and a plurality of modular sensing devices 27 of a sensing array/structure 27$s$ e.g., coupled to different, or same, target product/part 20.

Figure 3:
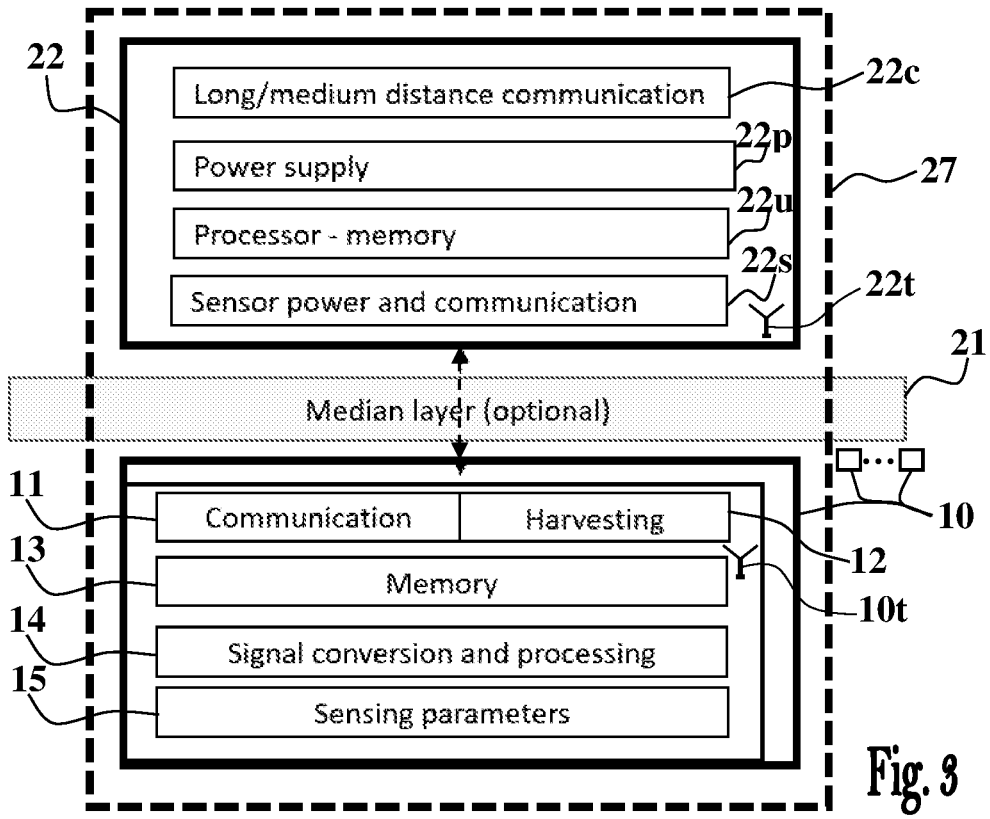
FIG. 3 schematically illustrates a possible configuration of the modular sensor device according to some embodiments.

In possible embodiments multiple embeddable sensor modules 10 integrated into the same (or different) part/product/system are configured to be powered by, and communicate measurement data/signals with, a single detachable reading module 22. FIG. 3 schematically illustrates assembly of the modular sensor device 27 with its sensing and reading modules 10,22 placed in opposing sides of at least one median layer (e.g., wall portion of vessel/container, bag, package, reactor, pipe/tube, or suchlike) 21. As exemplified in FIG. 3, a single detachable reading module 22 mounted at one side of the at least one median layer 21 can be used to operate (i.e., power and communicate data/signals with) a plurality of embeddable sensor modules 10 mounted at the opposite/other side of the at least one median layer 21.

The embeddable sensor module(s) 10 is configured for integration into products/parts/technical elements, and thus referred to herein as an internal module/device. The detachable reading module 22 can be also integrated into the same (or adjacently located) products/parts/technical elements, but in the embodiment disclosed herein it is installed in the vicinity (or attached to) the products/parts/technical elements carrying the embeddable sensor module(s) 10, and thus referred to herein as an external module/device. The antennas 10t,22t used to wirelessly communicate between the internal and external modules are placed in some embodiments as close as possible one to the other for improved coupling and communication.

Figure 4A:
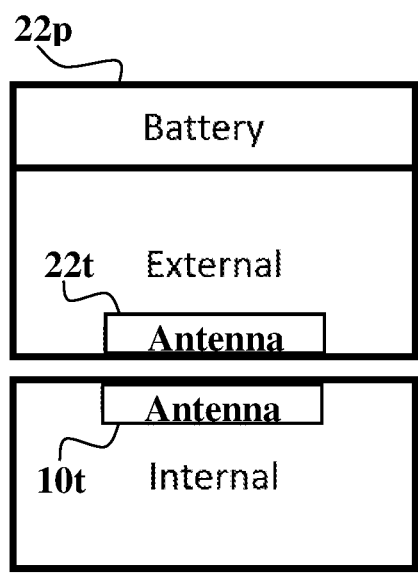
FIGS. 4A and 4B schematically illustrate possible wireless configurations of the modular sensor device.
Figure 4B:
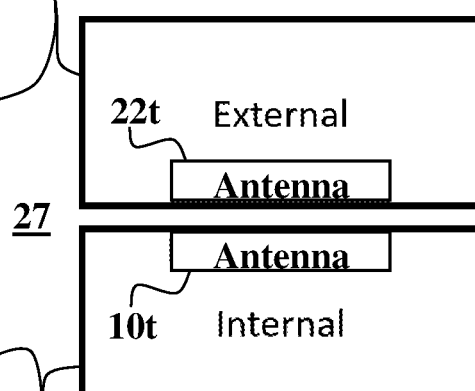

FIGS. 4A and 4B schematically illustrate wireless configurations of the modular sensor device 27 with antenna elements 22t,10t installed in the detachable reading module 22 and in the embeddable sensor module 10, respectively. As seen, the modular sensor device 27 is assembled by placing the external detachable reading (power and communication) module 22 in the vicinity of the internal/embeddable sensor (and processing module) module 10, and establishing data communication therebetween.

As exemplified in FIG. 4B, the external detachable reading module 22 can be a fully replaceable module that can be removed and replaced whenever needed. Or, as exemplified in FIG. 4A, it may be configured to have a replaceable power source (e.g., replaceable battery) 22p i.e., only the power source 22p can be replaced/renewed instead of replacing the entire reading module 22. Optionally, each module of the modular sensor device 27 can be part of a separate device e.g., the embeddable sensor module 10 can be mounted inside a single use bioreactor, and the external detachable reading module 22 can be mounted inside the reactor's reusable door.

Figure 5:
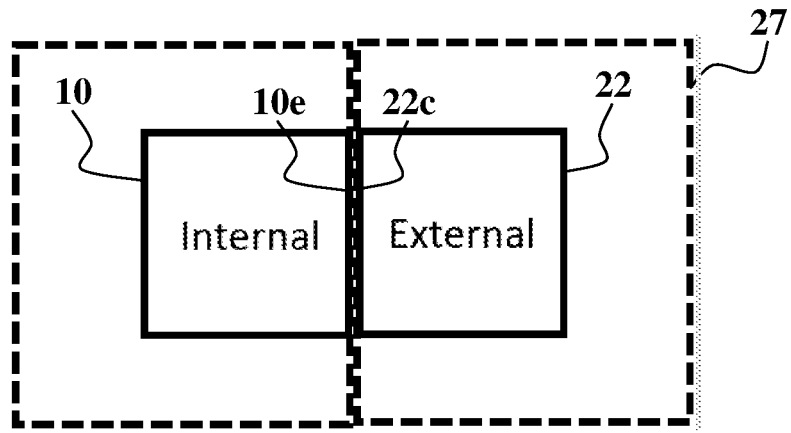
FIG. 5 schematic illustrates another possible configuration of the modular sensor device according to some embodiments.

The embeddable sensor module(s) 10 and detachable reading module 22 are configured in some embodiments for mounting in direct contact one with the other. FIG. 5 schematically illustrates another possible configuration of the modular sensor device 27, wherein the connectivity between the embeddable sensor module 10 and the detachable reading module 22 is obtained by respective contact pads 10e,22c. Accordingly, in this specific and non-limiting example the modular sensor device 27 is assembled upon establishing electrical contacts between the contact pads 10e,22c of the respective internal/embeddable sensor module 10 and the external/detachable reading module 22.

Figure 6A:
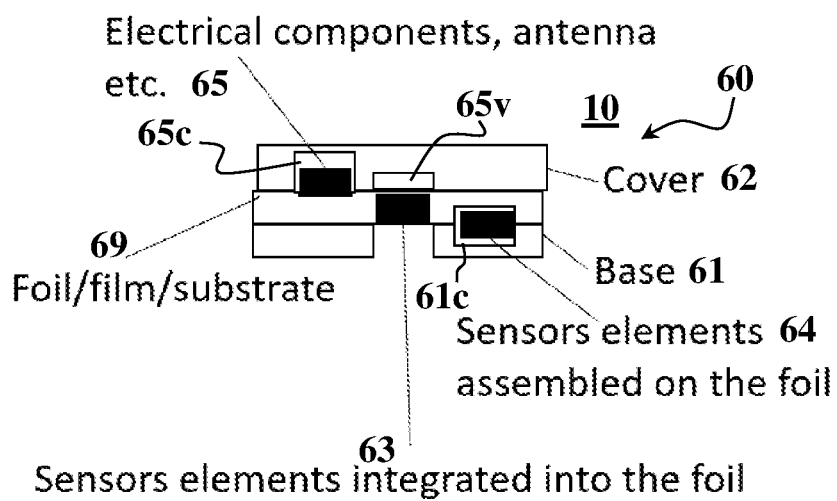
FIGS. 6A and 6B schematically illustrate possible configurations of the embeddable sensor module according to possible embodiments.
Figure 6B:
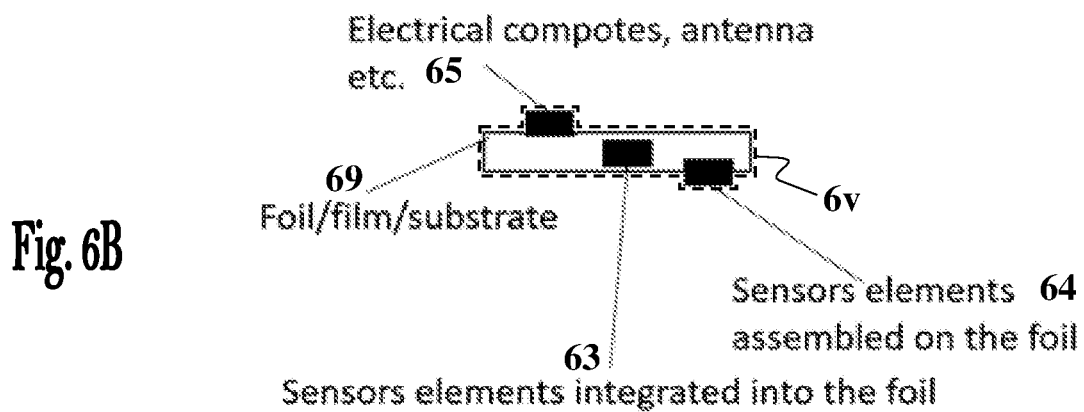

In order to facilitate integration of the embeddable sensor module 10 inside products/parts/technical elements in possible embodiments it is implemented as a readily embeddable chip device e.g., about 1×1×0.1 to 100×100×30 millimeters, or a thin sensing foil e.g., having thickness of about 0.001 to 10 millimeters. FIGS. 6A and 6B schematically illustrate possible configurations of the embeddable sensor module 10 as a chip 60, and as a sensing film/foil 69.

The chip (e.g., made of polymeric/plastic materials) configuration 60 shown in FIG. 6A comprises a sensing foil 69 (e.g., made of a multilayered structure) sandwiched between a base layer/element 61 (e.g., made of polymeric/plastic material, possibly including also polymeric/plastic reinforced materials) and a cover layer/element 62 (e.g., made of polymeric/plastic material, possibly including also polymeric/plastic reinforced materials). The sensing film/foil 69 comprises one or more sensor elements 63 implemented/integrated on or in the sensing foil/film 69 (e.g., by lamination, patterning or any of the techniques described in International Patent Publication Nos. WO 2018/092130, WO 2018/025264, WO 2018/235087, WO 2019/171376, and/or WO 2020/129069, of the same applicant hereof, the disclosure of which is incorporated herein by reference).

The sensing film/foil 69 implementation exemplified in FIGS. 6A and 6B may comprise one or more sensor elements 64 e.g., implemented/integrated over or in a face of the sensing film/foil 69 (e.g., surface mount device—SMD mounted by surface mounting assembly techniques, and/or lamination techniques) facing the base layer/element 61. In some embodiments the sensing film/foil 69 comprises electrical/circuitries/antennas 65 e.g., implemented/integrated/assembled over or in a face of the sensing film/foil 69 (e.g., by patterning, SMD assembly techniques) facing the cover layer/element 62.

One or more open cavities 65c can be formed (e.g., during the molding process or by CNC, drilling, etching techniques) in the cover layer/element 62 for accommodating at least a portion of the electrical/circuitries/antennas 65 implemented/integrated in/on the upper side of the sensing film/foil 69. Similarly, one or more open cavities 61c can be formed (e.g., during the molding process or by CNC, drilling, etching techniques) in the base layer/element 61 for accommodating at least a portion of the sensor elements 64 implemented/integrated in/on the bottom side of the sensing film/foil 69. The cover layer/element 62 can also comprise one or more open cavities 65v located over a portion of the sensing film/foil 69 in which the one or more sensor elements 63 are located, for allowing inward and/outwards deformations thereof. The sensing film/foil 69 is attached in some embodiments to the base 61 layer by gluing and/or welding techniques (heat, ultrasonic or laser) and/or lamination. The cover layer 62 is attached in some embodiments to the sensing film/foil 69 layer by gluing and/or welding techniques (heat, ultrasonic or laser) and/or lamination.

As seen in FIG. 6B, the sensing film/foil 69 comprises in some embodiments the same sensing and electrical/antenna elements 63,64,65 of the chip device 60, but without the base and cover layers/elements (61,62). In this non-limiting example, the sensing/electric/antenna components 63,64,65 of the sensing film/foil 69 can be coated with very thin protective layer (designated by dashed-line 6v e.g., made of acrylic and/or epoxy based material, parylene or any other suitable coating e.g., having thickness of about 0.0001 to 5 millimeters) usable for providing electrical isolation and/or moisture/water/liquid prevention/protection.

As will be demonstrated in the following paragraphs, the modular sensor designs disclosed herein can be utilized to construct a variety of different measurement setups usable for a myriad of sensory applications, wherein the sensing and reading modules are embedded into (or coupled to) the same, or different, part/product/technical element, utilizing different coupling techniques, and/or distributed in/over area/volume of the part/product/technical element to construct sensing array/structures capable of simultaneously measuring different properties and/or conditions of interest.

FIG. 7A schematically illustrates a possible application of the modular sensor device 27, wherein the embeddable sensor module 10 is integrated (e.g., as a sensing film/foil 69 or as a chip 60) into a plastic body 70 (e.g., cap) having an open cavity 70c for measuring properties/conditions of a substance or product 72 (e.g., inside a vessel—not shown) sealed by the plastic body 70. As shown, the detachable reading module 22 can be placed/mounted in a vicinity of the embeddable sensor module 10 for allowing it to wirelessly energize the embeddable sensor module 10 and communicate data therewith.

FIG. 7B schematically illustrates a possible application of the modular sensor device 27, wherein the embeddable sensor module 10 is integrated into a polymeric sheet/film 71 (e.g., bag or container, such as fishery pallets) e.g., as a sensing film/foil (69), for measuring properties/conditions of a substance or product 72 contacting the polymeric sheet/film 71. As in the previous examples, the detachable reading module 22 can be placed/mounted in a vicinity of the embeddable sensor module 10 for allowing it to wirelessly energize the embeddable sensor module 10 and communicate measurement data therewith.

FIG. 7C schematically illustrates a possible application of the modular sensor device 27, wherein the embeddable sensor module 10 is integrated into a polymeric sheet/film 71 (e.g., of a bag or container, such as fishery pallets) as a chip (60) for measuring properties/conditions of a substance or product 72 contacting the polymeric sheet/film 71. As in the previous examples, the detachable reading module 22 can be placed/mounted in a vicinity of the embeddable sensor module 10 for allowing it to wirelessly energize the embeddable sensor module 10 and communicate measurement data therewith.

FIG. 7D schematically illustrates a possible application of the modular sensor device 27, wherein the embeddable sensor module 10 is integrated into a wall of a pipe/tube 73 (e.g., as a chip 60) for measuring properties/conditions of a substance or product 72 contacting the inner wall side of the pipe 73. As in the previous examples, the detachable reading module 22 can be placed/mounted in a vicinity of the embeddable sensor module 10 for allowing it to wirelessly energize the embeddable sensor module 10 and communicate data therewith.

Figure 7E:
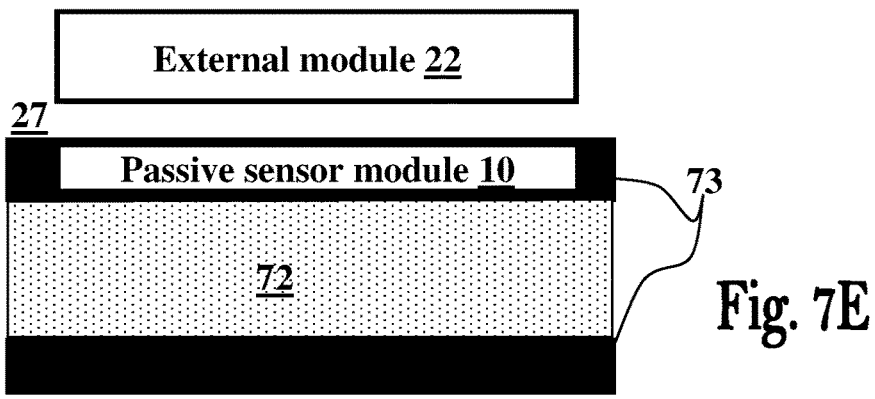

FIG. 7E schematically illustrates a possible application of the modular sensor device 27, wherein the embeddable sensor module 10 is integrated into a wall of a pipe 73 (e.g., as a sensing film/foil 69) for measuring properties/conditions of a substance or product 72 contacting the inner wall side of the pipe 73. As in the previous examples, the detachable reading module 22 can be placed/mounted in a vicinity of the embeddable sensor module 10 for allowing it to wirelessly energize the embeddable sensor module 10 and communicate measurement data therewith.

Figure 7F:
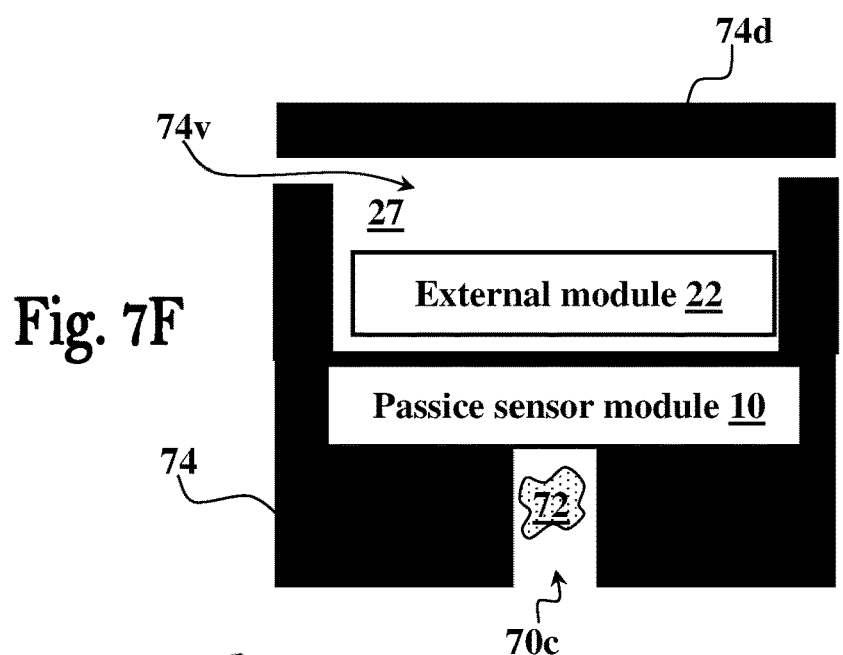

FIG. 7F schematically illustrates a possible application of the modular sensor device 27, wherein the embeddable sensor module 10 is integrated into (e.g., as a sensing foil/film 69 or as a chip 60) into a plastic body 74 (e.g., cap) having an open cavity 70c for measuring properties/conditions of a substance or product 72 inside a vessel (not shown) sealed by the plastic body 74. The detachable reading module 22 is placed inside a sealable/closeable cavity 74v of the plastic body 74. The detachable reading module 22 can be removed (e.g., to replace its battery or the entire module) by removing the sealing/closure element 74d of the cavity 74v. In embodiments wherein the embeddable sensor module 10 is a disposable unit, the detachable reading module 22 can be removed from the cavity 74v of the plastic body 74, and reused if so needed.

Figure 7G:
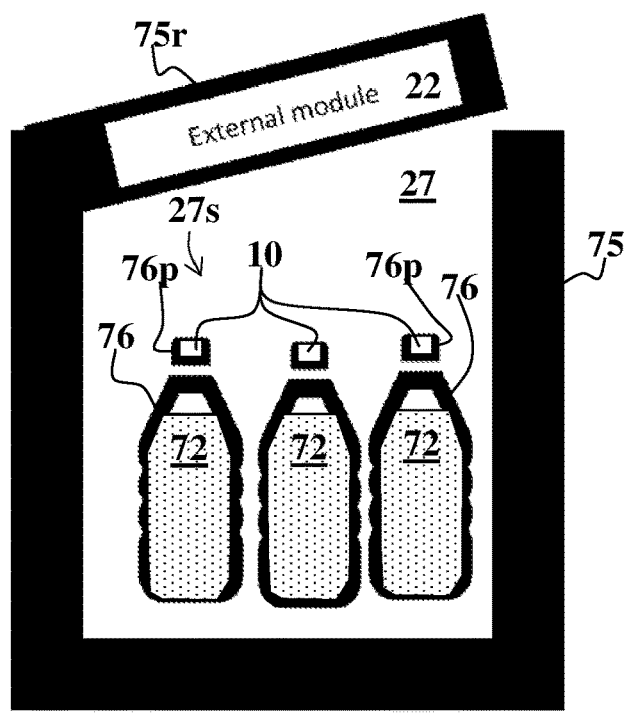

FIG. 7G schematically illustrates a possible application of the modular sensor device 27, wherein a plurality of the embeddable sensor modules 10 are integrated into (e.g., as a sensing foil/film 69 or as a chip 60) lids 76p (e.g., caps) of a plurality of vessels/containers 76 (e.g., bottles, test tubes, vials) contained inside a container/box 75, and at least one detachable reading module 22 is mounted on or in the cover 75r of the box/container 75. In this specific embodiment each of the embeddable sensor modules 10 is configured to measure properties/conditions of a substance or product 72 contained inside a respective one of the plurality of vessels 76, and a single detachable reading module 22 is used to communicate measurement data with the plurality of embeddable sensor modules 10. It is noted that in possible embodiments the detachable reading module 22 is alternatively mounted on, or in, any other part of the container/box 75 e.g., on/in one of the walls or the floor of container/box 75.

In other possible embodiments the embeddable sensor modules 10 are placed in parts of the packaged products e.g., vessels/containers 76 in a manner allowing the positioning of the reading module 22 so as to improve power transmission and communication performance therebetween e.g., by minimizing distances and guaranteeing direct line-of-sight (LoF i.e., free of obstacles/interfering elements) between the sensor modules 10 and reading module 22.

This way, a single detachable reading module 22 can be used to monitor the properties conditions of the substances 72 contained inside the plurality of vessels 76, by receiving the measurement data from their respective plurality of embeddable sensor modules 10 and communicating the same to an external data/monitoring center (not shown), thereby forming a sensing array/structure 27s.

Figure 7H:
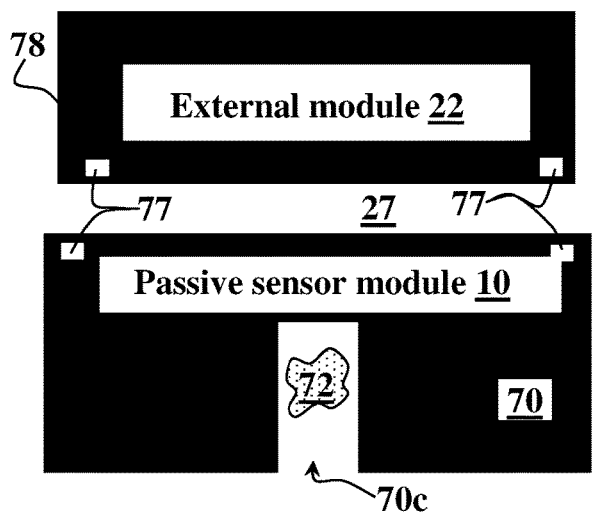

FIG. 7H schematically illustrates a possible application of the modular sensor device 27, wherein the embeddable sensor module 10 is integrated (e.g., as a sensing film/foil 69 or as a chip 60) into a plastic body/element 70 (e.g., cap) having an open cavity 70c for measuring properties/conditions of a substance or product 72 inside a vessel (not shown) sealed by the plastic body/element 70. The detachable reading module 22 is integrated inside a detachable housing 78 connectable to the plastic body 70 by mechanical connection or magnets connecting means 77.

Figure 7I:
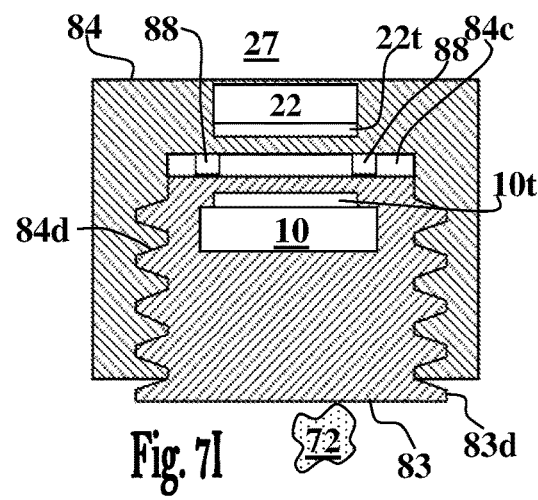

FIG. 7I schematically illustrates a possible application of the modular sensor device 27, wherein the embeddable (internal) sensor module 10 is integrated (e.g., as a sensing film/foil 69 or as a chip 60) into a plastic body/element 83 having screw threads 83d (e.g., threaded plug element) for measuring properties/conditions of a substance or product 72 in contact with, or in the vicinity of, the plastic body/element 83. The (external) detachable reading module 22 is integrated inside a detachable element (e.g., cup) 84 connectable to the plastic body/element 83 by respective matching screw threads 84d. In this non-limiting example, the detachable element 84 comprises a cavity 84c and its respective matching screw threads 84d are formed in inner walls of the cavity 84c. The communication between the embeddable sensor module 10 and the detachable reading module 20 can be established by means of contact pads 88 e.g., placed inside the cavity 84c, and/or wirelessly using the antenna elements 10t,22t. Though FIG. 7I demonstrates data communication by both contact pads 88 and antenna elements 10t,22t there is of course no need to provide both data communications means i.e., either direct contact or wireless/contactless data communication can be used.

It is noted that in all of the embodiments/examples provided herein the embeddable sensor module 10 can be provided either integrated inside the product/part/technical element, or on an inner wall thereof, or on an outer wall thereof.

EXAMPLES

The present invention will be described in greater detail by way of specific examples. The following examples are offered for illustrative purposes only and are not intended to limit the invention in any manner. Those of skill in the art will readily recognize a variety of non-critical parameters that can be changed or modified to yield essentially the same results.

Example 1

Figure 8:
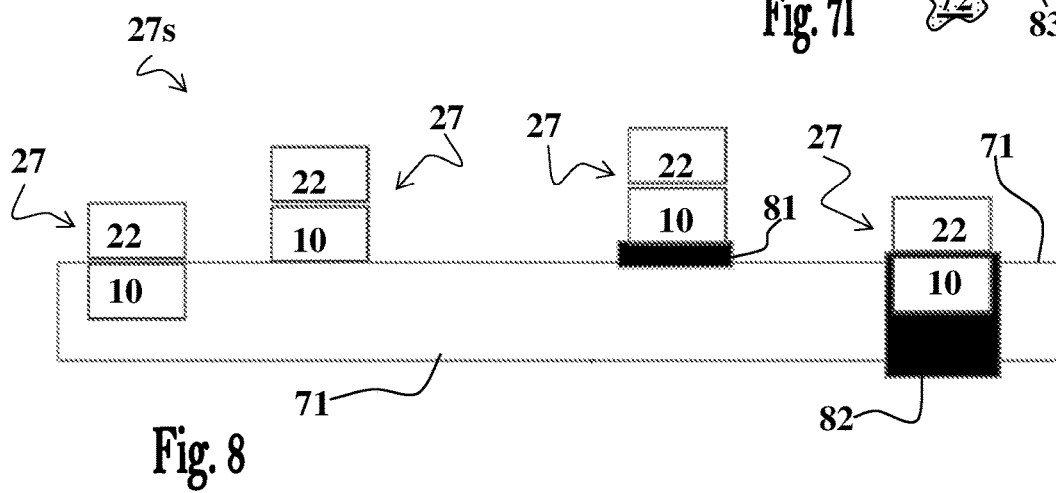
FIG. 8 schematically illustrates use of the modular sensor device in pipelines according to possible embodiments.

FIG. 8 schematically illustrates use of the modular sensor device 27 in pipelines e.g., for wireless remote monitoring of water, or gas, or any other fluidic substance. As exemplified in FIG. 8, the embeddable sensor module 10 can be installed inside the pipe 71, or in a wall section thereof, and the detachable reading module 22 can be externally placed over a section of the pipe containing the embeddable sensor module 10. In other possible embodiments the embeddable sensor module 10 can be attached to an external portion of the pipe 71, and the detachable reading module 22 can be placed in its close vicinity or directly attached thereto. In this specific and non-limiting example, a sensing array/structure 27s is constructed by distributing a plurality of sensing (10) and reading (22) module pairs coupled along the pipe 71.

In further possible embodiments the embeddable sensor module 10 is mounted inside a technical part/adapter 81 configured for attachment to the pipe 71. Additionally, or alternatively, the embeddable sensor module 10 can be embedded in connecting sleeves/adapter 82 used for connecting between extremities of two pipes 71, as also demonstrated in FIG. 8.

Example 2

Figure 9:
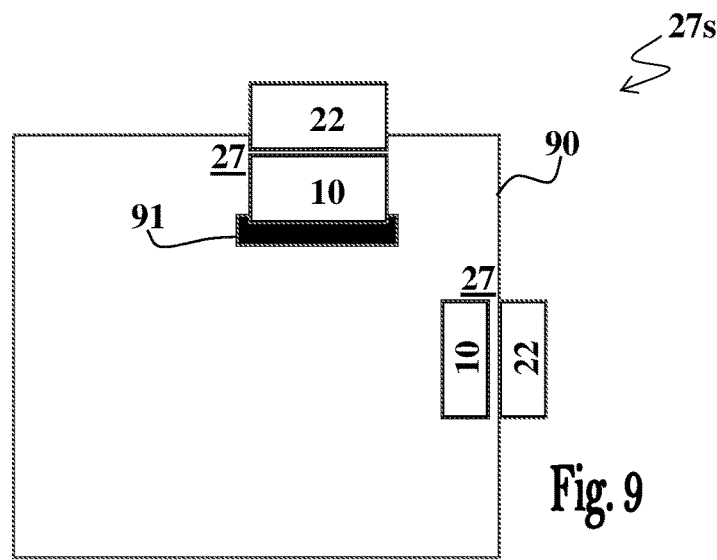
FIG. 9 schematically illustrates use of the modular sensor device in vessels (e.g., reactor bags) according to possible embodiments.

FIG. 9 schematically illustrates use of the modular sensor device 27 in reactor bags 90 e.g., single-use bags as used in the production of biopharmaceutical medications and in filling lines. As exemplified in FIG. 9, the embeddable sensor module 10 can be embedded/integrated in the wall of the reactor bag 90 and the detachable reading module 22 can be attached thereto in a vicinity thereof. Alternatively, the embeddable sensor module 10 can be attached (internally or externally) to the wall e.g., by adapter 91 of the reactor bag 90 and the detachable reading module 22 can be externally attached thereto in a vicinity thereof. The modular sensor device 27 can be used this way to wirelessly and remotely monitor substances contained/processed inside the bioreactors 90.

Similarly, the modular sensor device 27 can be used for monitoring in physical hydrogen storage units e.g., tanks. As in the previous example, a plurality of sensing (10) and reading (22) module pairs can be distributed over the reactor bag 90 to construct a sensing array/structure 27s.

Example 3

FIGS. 10A to 10D schematically illustrate implementations of the modular sensor device in fluid filtration equipment/parts/technical elements, as required in water desalination systems (e.g., reverse osmosis). In these non-limiting examples, the modular sensor devices disclosed herein are installed at one or more specific locations for monitoring one or more properties/conditions of importance for the filtration process.

Figure 10A:
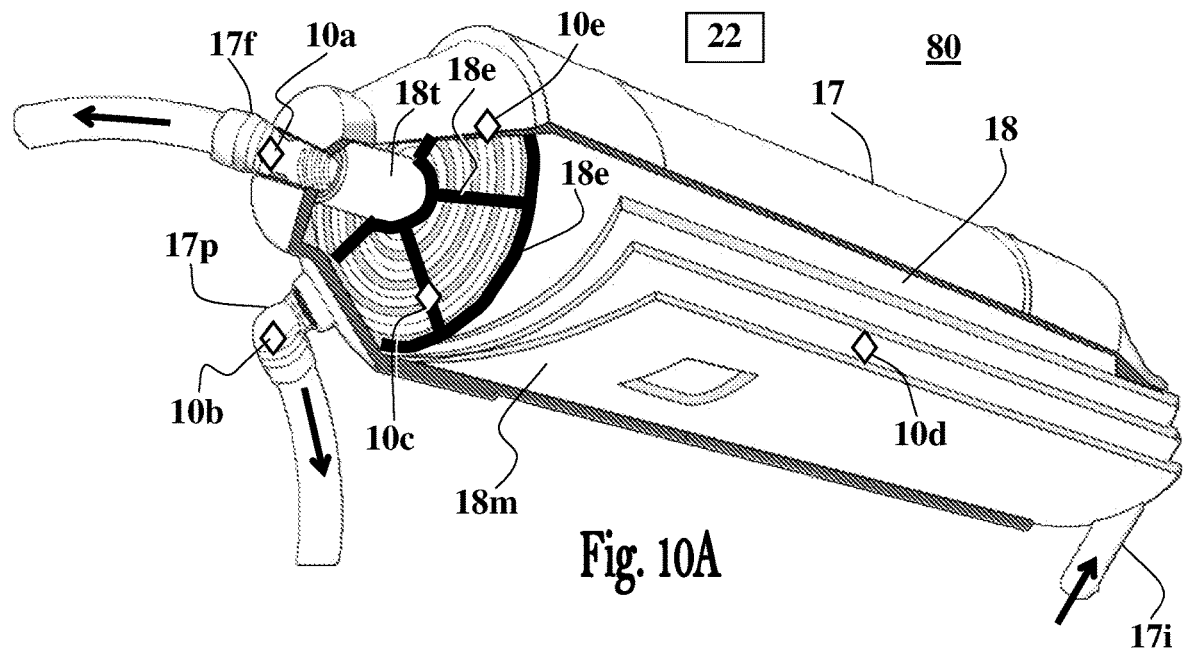
FIGS. 10A to 10D schematically illustrate implementations of the modular sensor device according to possible embodiments in fluid filtration equipment/parts, wherein FIG. 10A demonstrates integration of the embeddable sensor module in various different part/elements of the filtration equipment, FIG. 10B demonstrates a sensing array constructed by distribution of a plurality of embeddable sensor modules integrated into respective plurality of filtration units, FIG. 10C demonstrates a distributed sensing structure constructed by distribution of a plurality of embeddable sensor modules integrated into various different parts/elements of a filtration system, and FIG. 10D demonstrates a monitoring application usable with the modular sensor embodiments.

FIG. 10A demonstrates a distributed sensing structure according to a possible embodiment, constructed by integration of the embeddable sensor modules 10 in various different parts/locations of a filtration system 80. The filtration system 80 comprises one or more pressure vessels 17 (only one pressure vessel is shown in FIG. 10A) configured to filter/desalinate a stream of pressurized raw liquid (e.g., feedwater water) received via a fluid inlet 17i provided at a first end side thereof. The one or more pressure vessels 17 can be connected one to the other to construct serial/parallel filtration structures (not shown). The pressure vessel 17 comprises a filtration unit (e.g., rolled membrane) 18 packed/rolled inside the pressure vessel 17 for separating the pressurized row liquid into permeate (e.g., clean/desalinated water) and concentrate streams respectively discharged via a permeate outlet 17f and a concentrated row liquid outlet 17p provided at a second end side of the pressure vessel 17.

The permeate is obtained inside a central tube 18t passing through the filtration unit 18. The central tube 18t comprises perforations/pores at one or more portions thereof that are in contact with/attached to the filtration medium (e.g., membrane) 18m to facilitate passage of the permeate therethrough and into the central tube 18t. The first end side of central tube 18t (at the row liquid inlet 17i side) is sealed to prevent row liquid entry thereinto, and its second end side is fluidly connected to the permeate outlet 17f for discharging the stream of permeate therethrough. If there are several serially connected filtration mediums 18m inside the pressure vessel 17 then the first end side (i.e., located near the fluid inlet 17i) of the central tubes 18t of each consecutive filtration mediums 18m is connected to the permeate outlet 17f of a previous filtration medium 18m.

In this specific and non-limiting example an embeddable sensor module 10 is located in (10a) a technical element of the permeate outlet (e.g., pipe or adapter/connector connected thereto) 17f, and/or in (10b) a technical element of the concentrated row liquid outlet (e.g., pipe or adapter/connector connected thereto) 17p, and/or in/on (10c) an end member (e.g., an anti-telescoping device—ATD, as provided at the ends of reverse osmosis membrane elements) 18e coupled to the filtration unit 18 near the second end side of the pressure vessel 17, and/or in (10d) the filtration medium 18m, and/or in/on (10e) an inner wall portion of the pressure vessel 17. The embeddable sensor module 10 can be directly integrated into the technical elements and/or filtration membrane using any of the techniques disclosed herein. At least one detachable reading module 22 is installed in the vicinity of (or attached to) the pressure vessel 17 for periodically or intermittently powering/activating the embedded sensor elements 10 and receiving the measurement data/signals thereby generated and wirelessly transmitted. Optionally, a respective detachable reading module 22 is installed in the vicinity of each one of the embedded sensor modules 10.

Figure 10B:
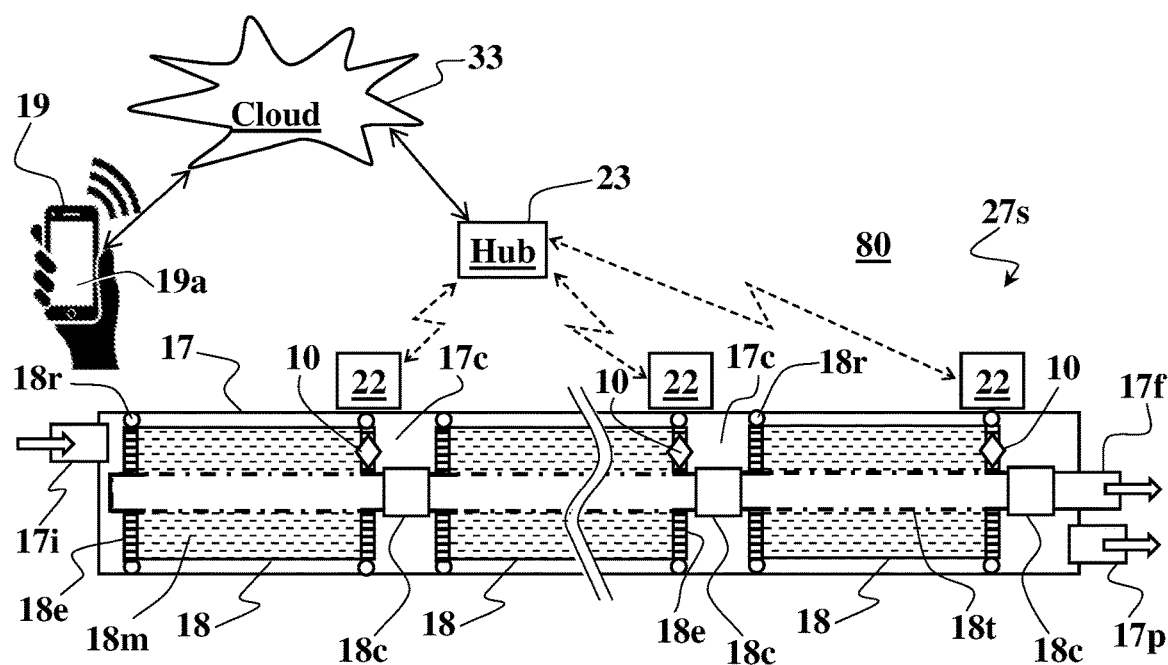

FIG. 10B demonstrates a distributed sensing modules array 27s constructed by integration of a plurality of embeddable sensor modules 10 into respective plurality of filtration units (reverse osmosis membranes) 18 concatenated inside an elongated pressure vessel 17. Each of the filtration units 18 comprises at least one "O"-ring sealing element (e.g., a brine seal) 18r coupled about one of its end members/anti-telescoping devices (ATD) 18e and pressed against the inner wall of the pressure vessel 17, to thereby sealably partition the pressure vessel into a respective plurality of compartments 17c. The central tubes 18t of the filtration units are connected in series by connectors 18c such that the filtrate from all filtration units 18 is accumulated thereinside and discharged from the pressure vessel via its permeate outlet 17f.

An embeddable sensor unit 10 is integrated into at least one end member/ATD 18e of each filtration unit 18, and a respective reading module 22 is adjacently installed outside the pressure vessel 17 for powering/activating its respective embedded sensor module 10 and receiving the measurement signals/data thereby generated and transmitted. In this specific and non-limiting example the sensor modules 10 are integrated/attached/assembled into the end members/ATDs 18e remote to the inlet 17i in each filtration unit 18, such that each compartment 17c of the pressure vessel 17 comprises a single sensor module 10, but they may be instead or additionally integrated into any other technical element of the filtration system 80 and/or into inner wall sections of the pressure vessel 17. In it is noted in this respect that the end members/ATDs 18e can be manufactured to integrally incorporate one or more embeddable sensor units 10. Alternatively, or additionally, the one or more embeddable sensor units 10 can be attached to, or embedded into, the end members/ATDs 18e after they are manufactured e.g., when or after they are attached to the filtration unit 18.

Optionally, but in some embodiments preferably, a data/signals communication computer/hub 23 is used to communicate data and/or control signals with the reading modules 22. The communication between the computer/hub 23 and the reading modules may be carried out over wireless communication channel(s) (e.g., Bluetooth/BLE, WiFi, Zigbee, LoRa, or suchlike) and/or over a serial/parallel data/signals communication bus (e.g., controller area network—CAN, RS232, RS485, UART, USB, SATA, IDE, SCSI, or suchlike). The computer/hub 23 can be configured to communicate the measurement data/signals received from the reading modules 22 to one or more remote devices/computers (e.g., personal computer, laptop, smart device/phone/tablet) 19, and/or a remote/cloud (33) data/control center/server, via one or more data networks 33.

Figure 10C:
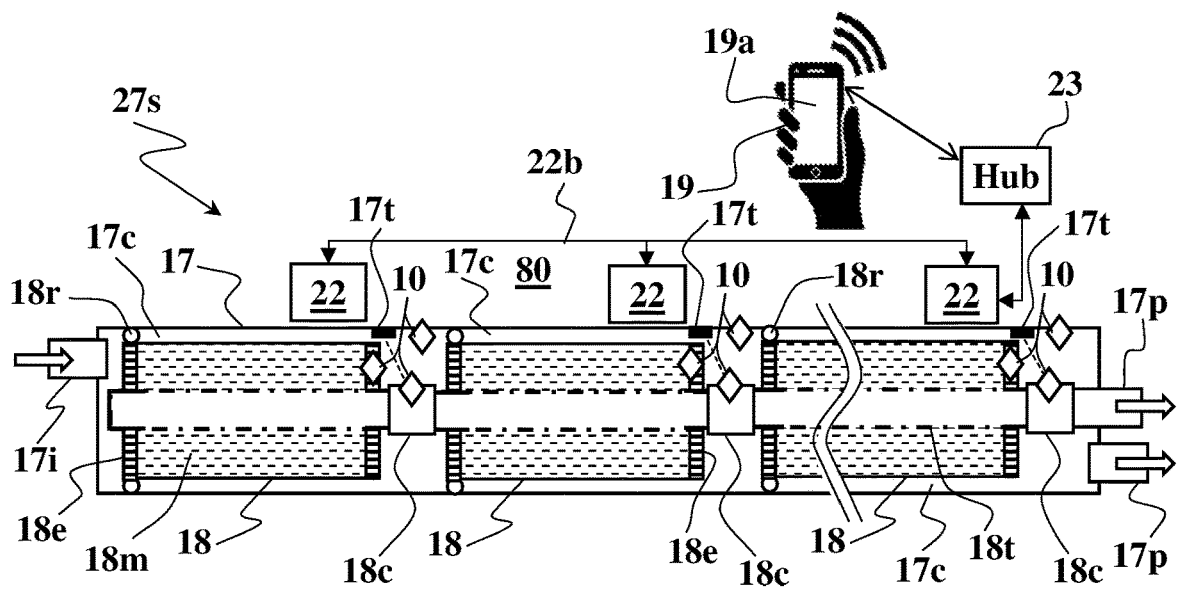

FIG. 10C demonstrates a distributed sensing structure 27s constructed by distribution of a plurality of embeddable sensor modules 10 integrated into various different parts/elements of the filtration system 80. In this specific and non-limiting example each compartment 17c of the pressure vessel 17 comprises a plurality of sensor modules 10 integrated into different technical elements provided therein. Particularly, one or more sensor modules 10 are integrated/attached/assembled into an end member/ATD 18e of each filtration unit 18, and/or into a connector/adapter 18c connecting between the central tubes 18t of adjacently located filtration units 18, and/or into an inner wall section of each compartment 17c of the pressure vessel 17.

In this specific and non-limiting example, the embeddable sensor modules 10 in each compartment 17c are powered/activated by a respective reading module 22 configured to receive the measurement data/signals generated by the various sensor modules 10 integrated into the technical elements of the compartment 17c. The reading modules 22 of the different compartments 17c are coupled for communication over a serial/parallel data bus 22b and configured to transmit the measurement data/signals received from the sensor modules 10 of the compartments 17c thereover.

Figure 10D:
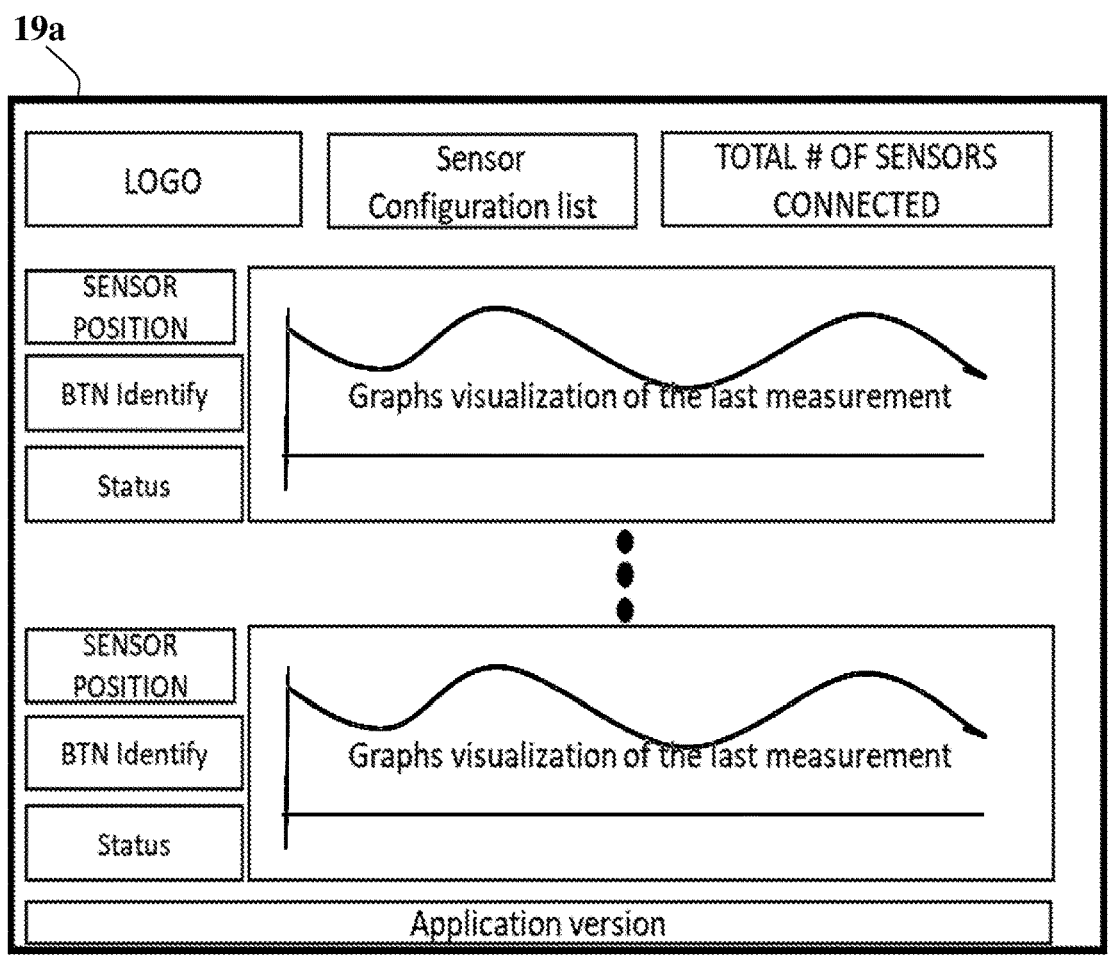

Optionally, one of the reading modules is configured to transmit (e.g., wirelessly and/or over a serial/parallel data bus) the measurement data/signals collected by all of the reading modules 22 to a computer/hub device 23. The computer/hub device 23 can be configured to wirelessly transmit the measurement data to a smart device 19 for processing and/or display by a process monitoring/control application 19a installed therein. FIG. 10D demonstrates a display provided by the monitoring/control application 19a of the smart device 19 (and/or of the computer/hub 23). The process monitoring/control application 19a can provide an interface with various push buttons for presenting a configuration list/scheme of the sensor modules 10, total number of sensor modules used, and for each sensor module 10 it can graphically display the measurement data/signals obtained from the sensor elements, BTN identify and status data thereof.

It is noted that each of the embeddable sensor modules 10 disclosed herein may comprise a number of different sensing elements that can be simultaneously read at each powering/activation instance to generate the measurement data/signals. For example, in possible embodiments each embeddable sensor module 10 is configured to measure pressure, electrical conductivity, pH, turbidity, temperature, and/or flow rate, of a fluid substance contained, processed and/or streamed e.g., in a technical element.

As exemplified in FIG. 10C, one or more antenna elements 17t can be provided electrically coupled (e.g., by wires) to one or more of the embeddable sensor modules 10. For example, the antenna elements 17t can be attached in each compartment 17c to the internal wall of the pressure vessel 17, and/or near the sensor module 10 of the end members/ATDs 18e, in the vicinity of the respective reading module 22, for communicating the measurement data signals therewith. In some embodiments the antenna elements 17t of the central (i.e., sensing the filter water inside the connectors 18c) sensor are brought close to the antenna elements of at least one other senor module 10 mounted inside the same compartment 17c e.g., the sensor module mounted on or in the end members/ATDs 18e, to thereby improve the external/remote powering of the sensor modules due to the reduced distance from the respective external reading module 22. It noted that having two or more of the antenna elements of the senor modules 10 of each compartment 17c adjacently located one to the other thereinside provides improved alignment with the antenna element (22t) of the power and communication module (22s) of the external reading module 22.

It is noted that although in the specific and non-limiting example shown in FIG. 10C each filtration unit 18 comprises a single "O"-ring sealing element 18r place on the end member/ATD 18e located closer to the inlet 17i, in possible embodiments each filtration unit 18 may comprise two "O"-ring sealing elements 18r places on each of its end members/ATDs 18e, as shown in FIG. 10B.

Figure 11A:
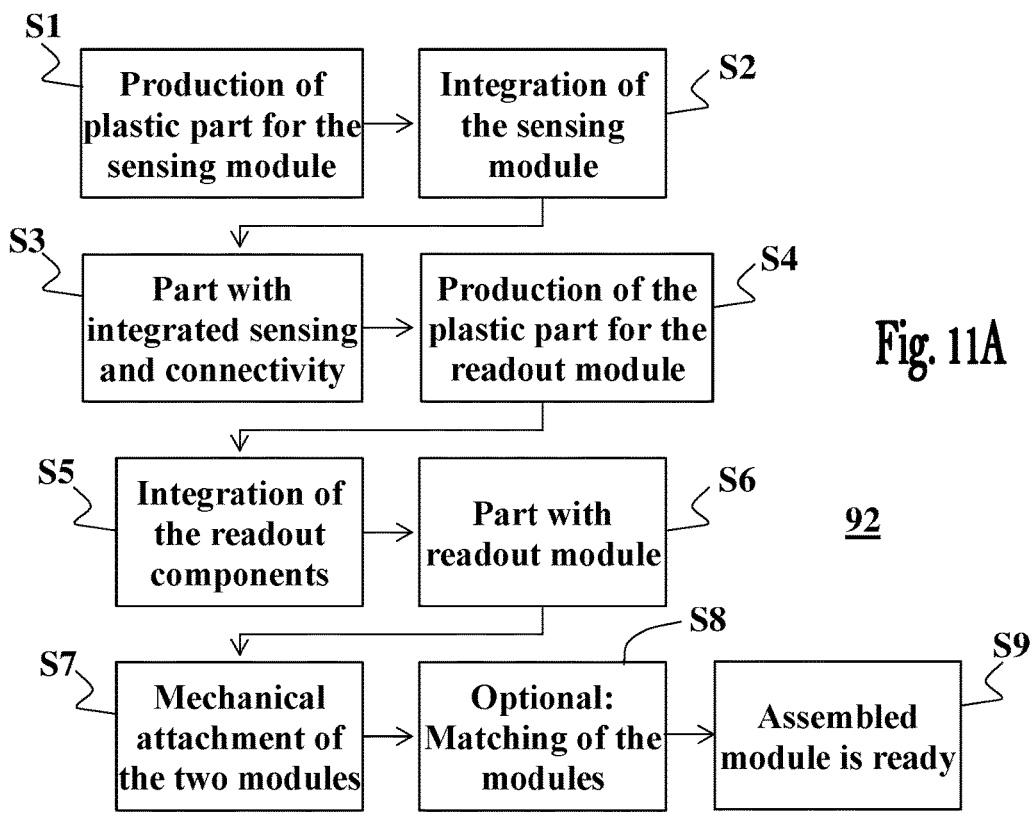

FIG. 11A is a flowchart schematically illustrating a process 92 of manufacturing and assembling a modular sensor device (27) according to some embodiments. In step S1 a product/part/technical element (e.g., made of plastic/polymer), to be monitored by the sensor device module (10), is fabricated. In step S2 one or more of the embeddable sensor modules (10) are integrated/attached/assembled in/on the product/part/technical element e.g., during manufacture or installation thereof, to thereby provide in step S3 the product/part/technical element having the embeddable sensor module (10) integrally mounted in it. In step S4 the detachable reading module (22) is manufactured (e.g., from plastic/polymeric materials), and in step S5 the detachable reading module (22) is mounted in a vicinity of the embeddable sensor module (10), or in a direct contact therewith, to thereby provide in step S6 the product/part/technical element equipped with the detachable reading module (22).

If mechanical attachment is required between the detachable reading module (22) and the embeddable sensor module (10), in step S7 the modules are mechanically attached one to the other e.g., by screw threads. Optionally, a matching step S8 is carried out to verify that the detachable reading module (22) manages to energize/activate the embeddable sensor module and receive measurement data/signals transmitted therefrom, and that the embeddable sensor module manages to harvest the energy transmitted thereto by the detachable reading module, use its one or more sensing elements to generate measurement data/signals, and transmit the same to the detachable reading module. The assembled modular sensor device is operable ready for use in step S9.

Figure 11B:
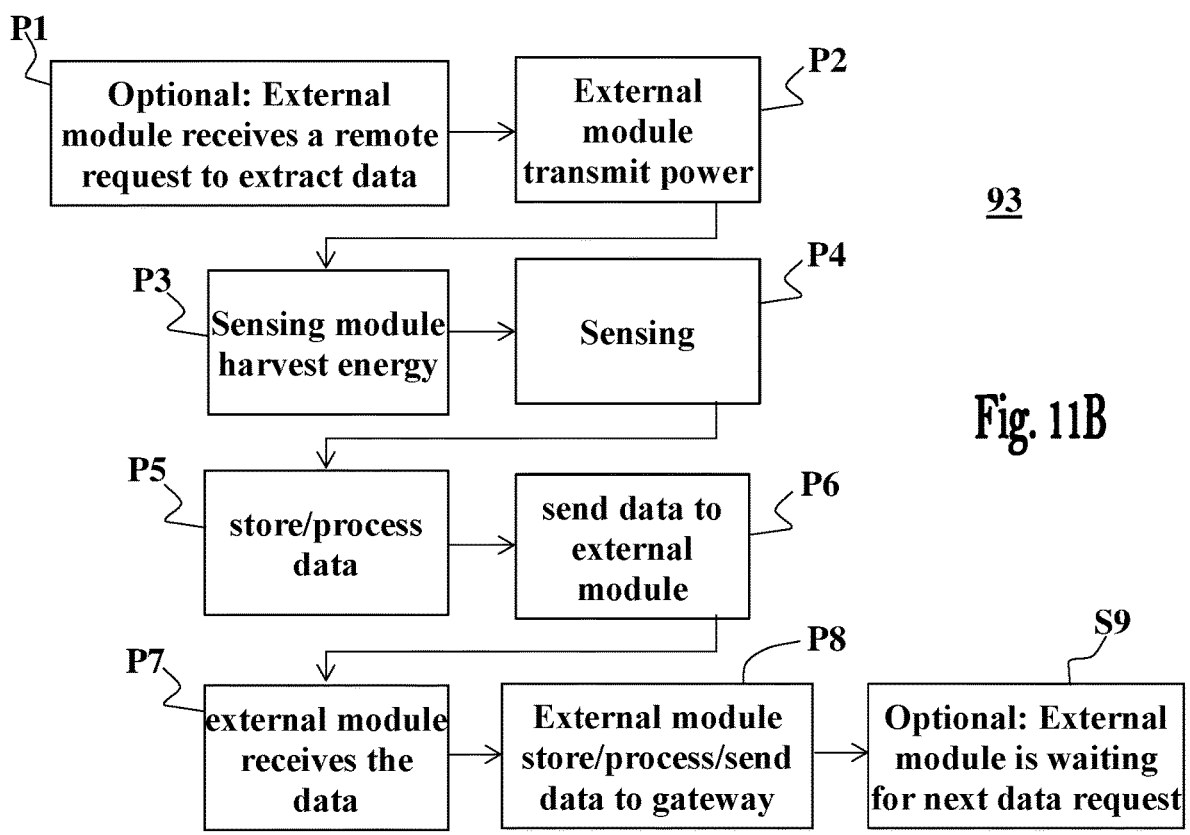

FIG. 11B is a flowchart schematically illustrating a process 93 of operating the modular sensor device according to a possible embodiment. In optional step P1 the detachable reading module (22) receives a request from a remote system/device (e.g., via computer/hub 23) to provide measurement data/signals from the embeddable sensor module (10). The request can be configured to instruct the reading module (22) to read the measurement data/signals from the sensor module, and it can be issued at predefined/specific reading intervals. However, in possible embodiments the reading module (22) is configured to read measurement data/signals from the sensor module(s) (10) periodically (or at predefined time intervals), without receiving any external command.

In Step P2 the detachable reading module (22) wirelessly energize the embeddable sensor module (10), and in step P3 the embeddable sensor module (10) harvests the energy from the detachable reading module (22). In step P4 the embeddable sensor module (10) measures at least one property or condition associated with the product/part/technical element into which it is integrated, and/or of a substance or product contained and/or processed therein, and/or streamed therethrough, and generate measurement data/signals or signals indicative thereof. In (optional) step P5 the embeddable sensor module (10) can optionally process and/or store the measurement data/signals in its internal memory.

In step P6 the embeddable sensor module (10) transmits the read and/or processed and/or stored measurement data/signals to the external detachable reading module (22). In step P7 the detachable reading module (22) mounted in the vicinity of the product/part/technical element receives the measurement data/signals transmitted by the embeddable sensor module (10). In step P8 the detachable reading module (22) stores and/or processes the measurement data/signals received from the embeddable sensor module (10), and/or transmits the same to the remote system/device (33/19). In optional step P9 the detachable reading module enters a wait state for receipt of further requests for measurement data/signals from the embeddable sensor module (10).

Figure 11C:
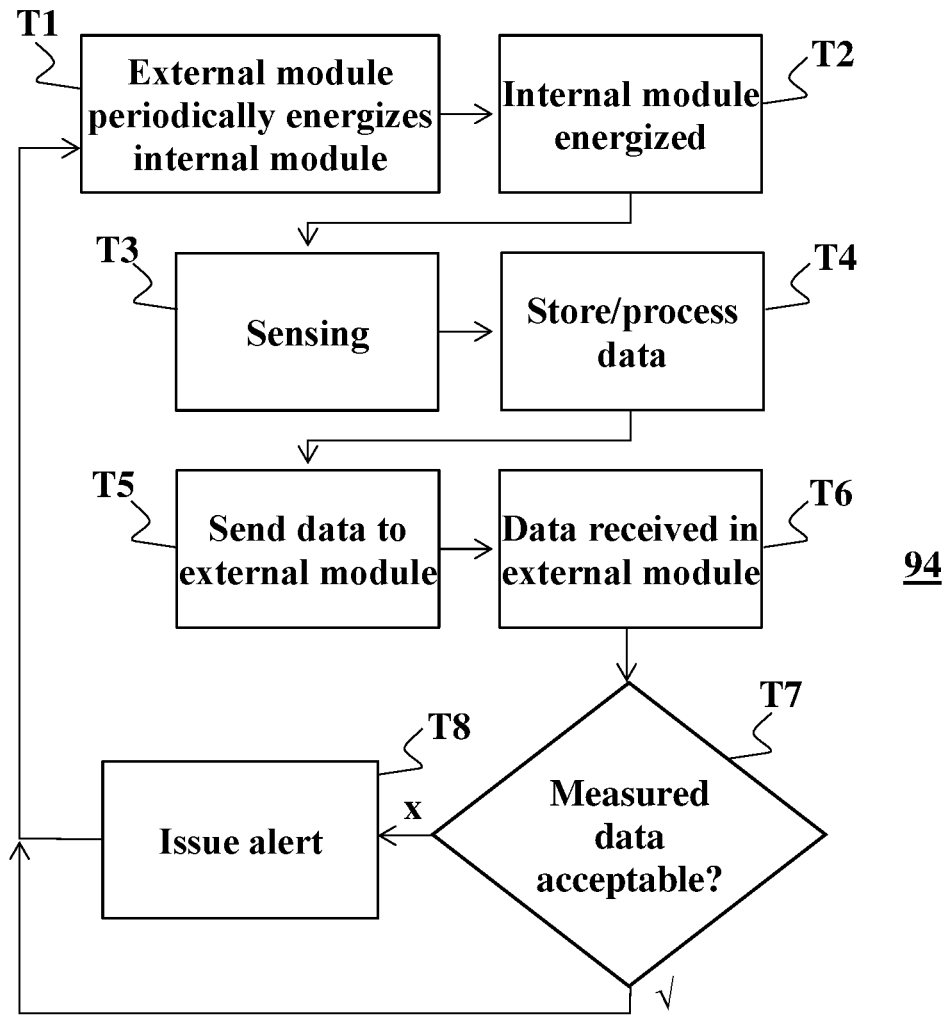

FIG. 11C is a flowchart schematically illustrating a process 94 utilizing the modular sensor device (27) according to a possible embodiment. In this non-limiting example, in step T1, the detachable reading module (22) periodically (or continuously or intermittently) energizes the embeddable sensor module (10) for receiving therefrom measurement data/signals. In step T2 the embeddable sensor module (10) is powered by the detachable reading module (22), for operably measuring in step T3 at least one property or condition associated with the product/part/technical element in which the embeddable sensor module (10) is integrated, and/or of a substance or product contained and/or processed in the product/part/technical element, and/or streamed therethrough.

Next, in (optional) step T4 the embeddable sensor module (10) can process and/or store the measurement data/signals thereby generated in its internal memory, and in step T5 the embeddable sensor module (10) transmits the measurement data/signals to the detachable reading module (22). In step T6 the detachable reading module (22) receives the measurement data/signals from the embeddable sensing module (10 e.g., wirelessly and/or via contact pads/wires). In step T7 the detachable reading module (22) check if the measurement data/signals received from the embeddable sensor module (10) is within tolerable/acceptable values, and issues an alert (e.g., audio-visual alert and/or by transmitting data/signals indicative thereof to an external device/system) in step T8 whenever the measurement data/signals received from the embeddable sensor module (10) is not within the tolerable/acceptable values.

Alternatively, or additionally, the external module transmits the measurement data/signals to the hub (23), which then transmit the same to the cloud center/remote server (33). The hub and/or the cloud/remote server can be configured to process the measurement data/signals and then issue the alert.

The process 94 can be restarted if it is determined in step T7 that the measurement data/signals received from the embeddable sensor module (10) is within the tolerable/acceptable values, and optionally also after the alert is issued in step T8, by transferring the control back to step T1.

It is noted that since in embodiments disclosed herein powering is not carried out using batteries, there is less/no risk of contamination of the monitored fluid/substance inside the product wherein the embeddable (passive) sensor module is integrated, which can simplify the regulatory validation of the sensor module and also its cost.

It should be understood that throughout this disclosure, where a process or method is shown or described, the steps of the method may be performed in any order or simultaneously, unless it is clear from the context that one step depends on another being performed first. Terms such as top, bottom, front, back, right, and left and similar adjectives in relation to orientation of the modular sensor and components of it refer to the manner in which the illustrations are positioned on the paper, not as any limitation to the orientations in which the apparatus can be used in actual applications.

As described hereinabove and shown in the associated figures, the present invention provides a modular sensor device designed for quick and easy integration in products/parts/technical elements e.g., of machinery/equipment, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:
1. A modular sensor device comprising:
an embeddable sensor module configured to directly integrate into a product or device, or a technical element thereof, by plastic integration, providing in situ sensing therein at least one property or condition associated with said product or device, or with a substance contained, processed or streamed therethrough, wherein said embeddable sensor module:

includes one or more sensor elements configured to sense the at least one property or condition and circuitry that generates measurement data/signals indicative of said at least one property or condition, and transmits the generated measurement data/signals to a device located external to said product or device, and is configured to be powered and activated by signals received from the external device.

2. The device of claim 1, wherein:

the external device is a detachable reading module configured to mount external to said product or device, and in a vicinity of said embeddable sensor module, and said detachable reading module is configured to activate said embeddable sensor module, and receive the measurement data thereby transmitted.

3. The device of claim 1, wherein the detachable reading module is configured to power the embeddable sensor module wirelessly, or via contact pads.

4. The device of claim 1, wherein the embeddable sensor module is implemented as a chip or an integratable sensing foil.

5. The device of claim 1, wherein the embeddable sensing module is at least partially made from polymeric/plastic materials configured to directly integrate into the product, or the device, or the technical element, by ultrasonic welding, extrusion, laser welding, gluing, heat welding, molding, injection molding, overmolding, layer-by-layer fabrication technique, or any combination thereof.

6. The device of claim 1, wherein the embeddable sensor module comprises a sensing layer and at least one base layer configured to directly integrate thereof into or onto at least one of a wall portion of the product or device, or a connector or adapter thereof.

7. The device of claim 1, wherein the detachable reading module is configured to transmit the measurement data to a computing device and/or a communication hub.

8. A distributed sensing array comprising:

a plurality of embeddable sensor modules of claim 1, integrated into a plurality of products or devices, or technical elements thereof; and at least one detachable reading module configured to mount external to at least one of said plurality products or devices, or technical elements thereof, and in a vicinity of said embeddable sensor modules, said at least one detachable reading module configured to wirelessly power and activate said plurality of embeddable sensor modules and receive the measurement data/signals transmitted from them.

9. The distributed sensing array of claim 8, having one of the following configurations:

the plurality of embeddable sensor modules are directly integrated into respective containers or vessels, or sealing lids/caps thereof;

the plurality of embeddable sensor modules are directly integrated into components of a filtration system; or at least one of the plurality of embeddable sensor modules is directly integrated into a wall of a pressure vessel.

10. The distributed sensing array of claim 8, having at least one embeddable sensor module directly integrated into one of the following:

a connector fluidly connecting permeate tubes of filtration units of the filtration system;

an end member of a filtration unit of the filtration system; or a filtration medium of a filtration unit.

11. The distributed sensing array of claim 8, configured to locate antenna elements of the embeddable sensor and detachable reading modules as close as possible one to the other for improved coupling/communication therebetween.

12. A use of the distributed sensing array of claim 8, for monitoring properties or conditions of food products.

13. A use of the distributed sensing array of claim 8, for monitoring or controlling a process inside a vessel or reactor.

14. A use of the distributed sensing array of claim 8, for monitoring or controlling a desalination process.

15. A method of monitoring or controlling at least one property or condition associated with a product or device, or a substance contained, streamed or processed thereinside, the method comprising:

directly integrating one or more embeddable sensor modules by plastic integration into at least one part or technical element of said product or device during manufacture or installation thereof, said embeddable sensor module comprising one or more sensing elements and being configured to be externally powered and activated to measure said at least one property or condition, and to generate and transmit measurement data or signals indicative thereof;

mounting at least one reading module in a vicinity of said product or device;

powering and activating said embeddable sensor module by said reading module to measure said at least one property or condition of said substance or product; and transmitting said data or signals from the embeddable sensing module.

16. The method of claim 15, wherein the directly embedding of the one or more embeddable sensor modules is carried out utilizing gluing, molding, injection molding, overmolding, extrusion, welding, heat welding, ultrasonic welding, laser welding, or layer-by-layer fabrication technique of the part or technical element.

17. The method of claim 15, further comprising wirelessly powering and activating the one or more embeddable sensor modules by the reading module.

18. The method of claim 15, further comprising wirelessly transmitting the data or signals from the one or more embeddable sensor modules.

19. The method of claim 15, comprising receiving by the at least one reading module the data or signals transmitted by the one or more embeddable sensor modules.

20. The method of claim 15, further comprising transmitting the data or signals to a remote device wirelessly, or over a data network.

* * * * *